(12) United States Patent
Kataoka

(10) Patent No.: US 6,954,022 B2
(45) Date of Patent: Oct. 11, 2005

(54) CONTROL APPARATUS FOR VIBRATION TYPE ACTUATOR

(75) Inventor: Kenichi Kataoka, Kanagawa (JP)

(73) Assignee: Canon Kabushiki Kaisha, Tokyo (JP)

(*) Notice: Subject to any disclaimer, the term of this patent is extended or adjusted under 35 U.S.C. 154(b) by 76 days.

(21) Appl. No.: 10/385,846

(22) Filed: Mar. 12, 2003

(65) Prior Publication Data

US 2003/0184190 A1 Oct. 2, 2003

(30) Foreign Application Priority Data

Mar. 27, 2002 (JP) ........................................ 2002-089275

(51) Int. Cl.⁷ .............................................. H01L 41/09
(52) U.S. Cl. .................................. 310/317; 310/316.01
(58) Field of Search ........................... 310/316.01, 317

(56) References Cited

U.S. PATENT DOCUMENTS

| | | | | |
|---|---|---|---|---|
| 4,879,528 A | * | 11/1989 | Gotanda | 331/4 |
| 5,001,404 A | | 3/1991 | Kataoka | 318/116 |
| 5,004,964 A | | 4/1991 | Kataoka et al. | 318/128 |
| 5,157,300 A | | 10/1992 | Kataoka et al. | 310/323 |
| 5,165,047 A | | 11/1992 | Shimizu | 318/116 |
| 5,285,134 A | | 2/1994 | Kataoka | 318/116 |
| 5,436,521 A | | 7/1995 | Kataoka | 310/317 |
| 5,459,370 A | | 10/1995 | Kataoka | 310/317 |
| 5,539,268 A | | 7/1996 | Kataoka | 310/316 |
| 5,631,516 A | | 5/1997 | Kataoka | 310/316 |
| 5,939,851 A | | 8/1999 | Kataoka et al. | 318/611 |
| 6,031,316 A | | 2/2000 | Kataoka | 310/316 |
| 6,049,156 A | | 4/2000 | Yamamoto et al. | 310/316.01 |
| 6,054,795 A | | 4/2000 | Yamamoto et al. | 310/316.01 |
| 6,084,334 A | | 7/2000 | Yamamoto et al. | 310/316.01 |
| 6,100,622 A | | 8/2000 | Yamamoto et al. | 310/316.01 |
| 6,313,564 B1 | | 11/2001 | Kataoka et al. | 310/316.01 |
| 6,376,965 B1 | | 4/2002 | Kataoka et al. | 310/317 |
| 6,437,480 B1 | * | 8/2002 | Saya | 310/316.01 |
| 6,570,294 B1 | * | 5/2003 | Iino et al. | 310/316.01 |
| 6,635,977 B2 | * | 10/2003 | Kataoka et al. | 310/116 |
| 2002/0096970 A1 | | 7/2002 | Hayashi et al. | 310/316.02 |
| 2002/0121869 A1 | | 9/2002 | Kataoka et al. | 318/114 |
| 2002/0180387 A1 | | 12/2002 | Kataoka | 318/114 |
| 2003/0020368 A1 | * | 1/2003 | Iino et al. | 310/317 |

FOREIGN PATENT DOCUMENTS

JP 2563351 9/1996 ............ H02N/2/00

* cited by examiner

Primary Examiner—Thomas M. Dougherty
(74) Attorney, Agent, or Firm—Fitzpatrick, Cella, Harper & Scinto

(57) ABSTRACT

Provided is a control device for a vibration type actuator having an elastic member fixed with an electro-mechanical energy conversion element, and a vibration member that generates a vibration on a surface of the elastic member by supplying a drive signal to the electro-mechanical conversion element, the control device including: a drive circuit that supplies a periodic signal to the electromechanical energy conversion element, a state detecting circuit that detects a drive state of the vibration member and outputs a waveform signal representing the detected drive state, an inclination detecting circuit that detects an inclination of a waveform in a given level of the waveform signal, and a control circuit that controls the drive circuit on the basis of an output signal from the inclination detecting circuit.

20 Claims, 13 Drawing Sheets

CONTROL APPARATUS FOR VIBRATION TYPE ACTUATOR

BACKGROUND OF THE INVENTION

1. Field of the Invention

The present invention relates to a control device for a vibration type actuator.

2. Related Background Art

In general, a vibration type actuator such as an ultrasonic motor includes a vibration member in which an electromechanical energy conversion element such as a piezoelectric element is fixed to an elastic member such as a metal, and a contact member that comes in pressure contact with the vibration member. A control circuit of the vibration type actuator supplies a drive signal to the electro-mechanical energy conversion element to generate a drive vibration on the surface of the vibration member, thereby relatively moving the vibration member and the contact member.

Then, the vibration member includes a piezoelectric element having drive phases at positions having a phase difference of, for example, 90° to each other spatially. The control circuit supplies two-phase alternating signals having a phase difference of 90° to each other temporally to those two drive phases, to generate a traveling wave on the surface of the elastic member and drive the contact member that is in pressure contact with the surface of the elastic member by a frictional force.

A frictional material is formed, adhered or coated on a contact portion between the vibration member and the contact member in order to obtain an appropriate frictional force.

Also, as parameters for controlling the drive speed of the vibration type actuator, there are used the voltage of the drive signal, the frequency of the drive signal, and the phase difference of the drive signals. Among them, a control using the frequency is preferably used because it can obtain both of a broad dynamic range and resolution, independently, and is also excellent in matching with a digital circuit that has been recently developed.

As a conventional frequency control method of the drive signal, the following methods are proposed.

As a first method, there is a method in which the vibration state of the vibration member is outputted, and the output signal is compared with a threshold voltage by a comparator to detect whether the output signal is larger or smaller, to thereby control the vibration type actuator in accordance with the detection, as disclosed in U.S. Pat. No. 5,165,047.

As a second method, there is a method in which the vibration amplitude of the vibration member and the amplitude of an applied voltage supplied to the vibration member are detected, an alternating signal which is detection information is compared with a plurality of voltages which are out of the center of the signal so as to be converted into a plurality of pulse signals, and the amplitude is obtained by using a data conversion table from the pulse width of the pulse waveform. The control method using the plurality of pulse signals is classified into a method in which a plurality of widths are summed to obtain a mean value, and a method in which the amplitude of a triangular wave is obtained from a difference in the pulse width assuming that the amplitude waveform is the triangular wave.

Then, in the above-mentioned first and second control methods, the obtained amplitude is so controlled as to become a given amplitude, and a drive frequency or the like is so controlled as to stabilize the drive speed and the output torque of the vibration type actuator.

However, in the above-mentioned first control method, because it is only possible to judge whether the output signal is larger or smaller than the given level by the result of the comparator, it is necessary to, for example, prepare a plurality of threshold values to detect the amplitude in order to accurately know the vibration amplitude, and a very large number of comparators are thus required.

Also, in the above-mentioned second control method, because a relationship between the pulse width and the amplitude is nonlinear, nonlinear calculation or the data conversion table is required. Also, the method in which the level of the comparison voltage is finely set to obtain the mean value is not enhanced in precision when the comparison level is small. Also, with the method in which the amplitude is calculated assuming that the amplitude waveform is triangular waveform, the precision in the detection of the vibration waveform amplitude of a sine wave is deteriorated.

Accordingly, in order to supply a control device of the vibration type actuator which can detect the drive state of the vibration member at a high speed and simply and cope with the high-speed change of the drive state, more improvements may be required.

SUMMARY OF THE INVENTION

The present invention has been made in view of the above-mentioned circumstances, and therefore one aspect of the present invention is a control device for a vibration type actuator, including a drive circuit that supplies a periodic signal to an electromechanical energy conversion element of a vibration type actuator to generate a vibration on an elastic member that constitutes a vibration member of the vibration type actuator, a state detecting circuit that detects the drive state of the vibration member and outputs a waveform signal representing the detected drive state, and an inclination detecting circuit that detects an inclination of the waveform in a given level of the waveform signal. The control device controls the periodic signal in accordance with the detected inclination and is capable of detecting the drive information of the vibration member by the simple detecting circuits at a high speed.

Other objects and advantages besides those discussed above shall be apparent to those skilled in the art from the description of a preferred embodiment of the invention that follows. In the description, reference is made to accompanying drawings, which form a part hereof, and which illustrate an example of the invention. Such example, however, is not exhaustive of the various embodiments of the invention, and therefore reference is made to the claims, which follow the description for determining the scope of the invention.

DESCRIPTION OF THE PREFERRED EMBODIMENTS

Now, a description will be given in more detail of preferred embodiments of the present invention with reference to the accompanying drawings.

Figure 1:
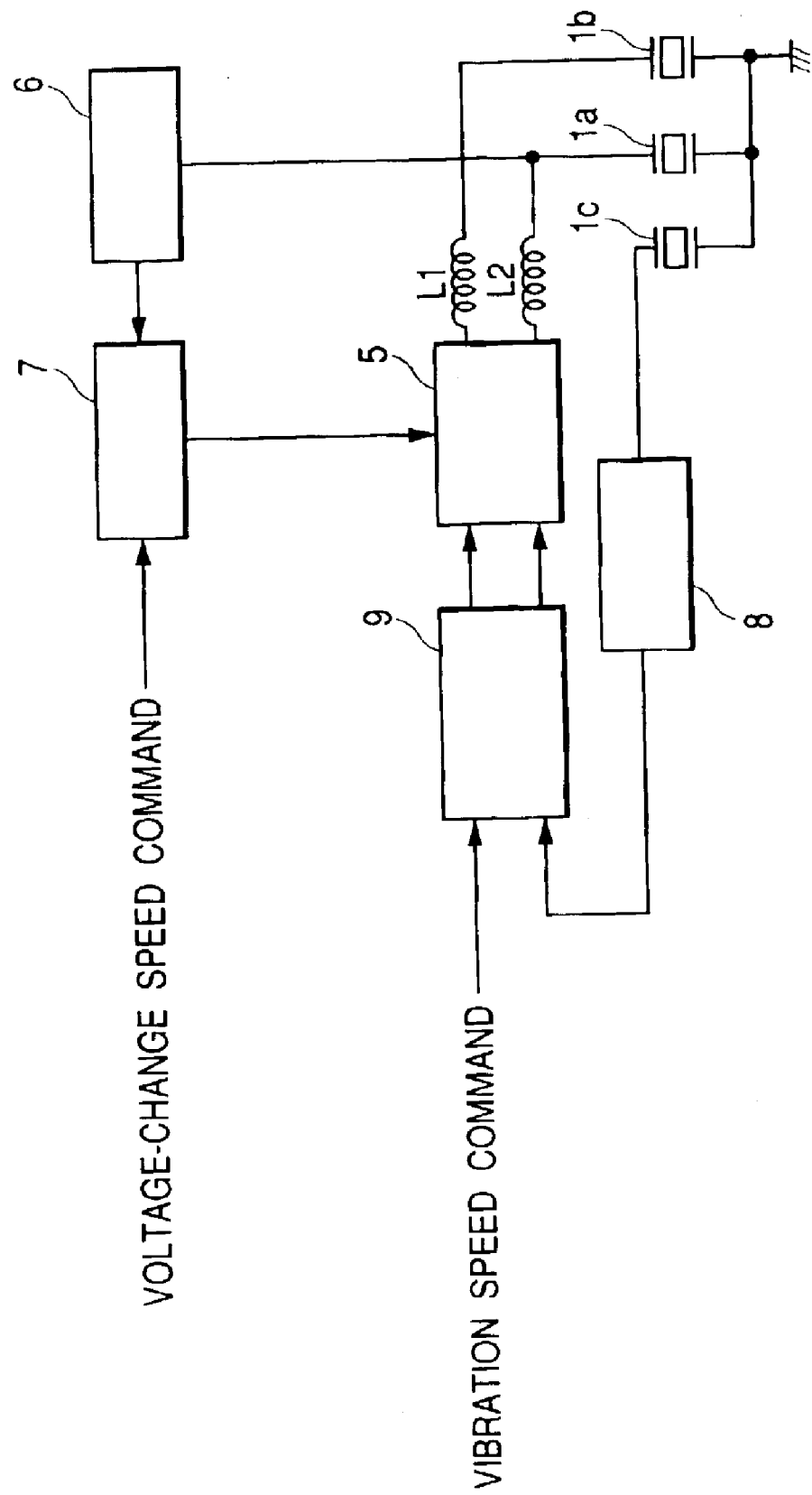
FIG. 1 is a block diagram showing a control device in accordance with a first embodiment of the present invention.
Figure 2:
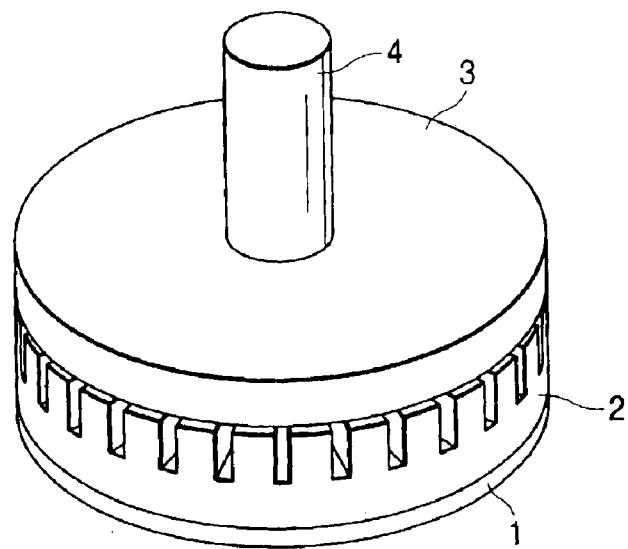
FIG. 2 is a perspective view showing the appearance of a vibration type actuator.
Figure 3:
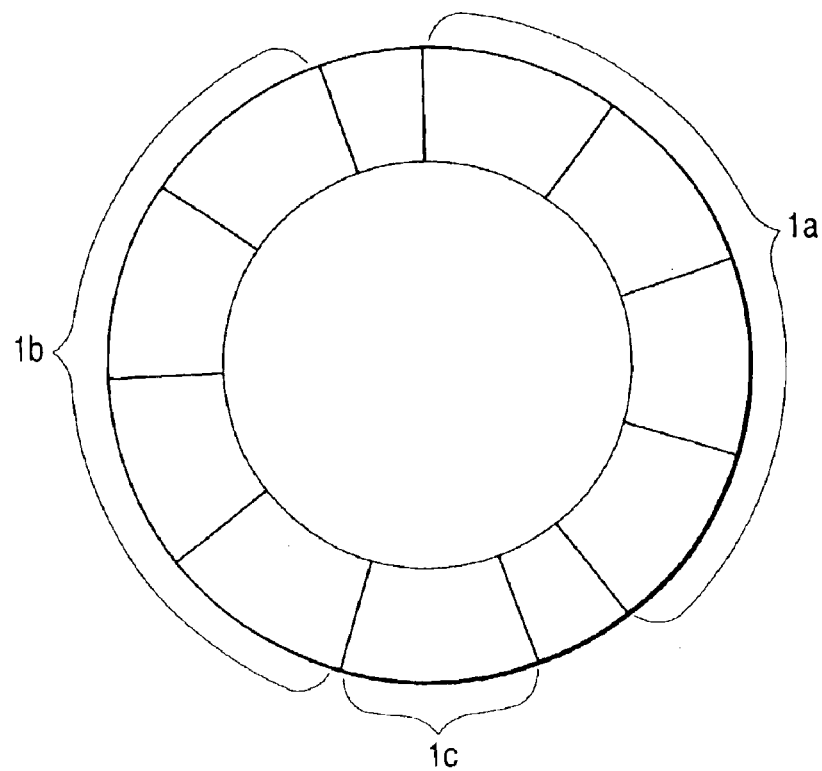
FIG. 3 is a diagram showing an electrode structure of a piezoelectric element shown in FIG. 2.

FIGS. 1 to 3 show a first embodiment of the present invention.

FIG. 1 is a circuit block diagram showing a control device in accordance with the first embodiment of the present invention, and FIGS. 2 and 3 are structural diagrams showing the structure of the vibration type actuator.

Referring to FIG. 2, the vibration type actuator according to this embodiment is so designed as to bring a disk shaped moving member in pressure contact with an annular vibration member, in which the annular vibration member is structured by providing a piezoelectric element 1 that serves as an annular electromechanical energy conversion element to one side of an annular elastic member 2. Then, a travelling vibration wave is formed in the elastic member 2 due to an exciting force generated by applying an AC voltage to the piezoelectric element 1.

Reference numeral 3 denotes a moving member which is brought in pressure contact with the elastic member 2 by a pressure means that is not shown, and rotationally moves due to a rotating force that is intervened by a frictional force exerted on a contact portion of the moving member 3 with the elastic member 2 by the travelling vibration wave formed in the elastic member 2. Reference numeral 4 denotes a rotary shaft that transmits the rotary motion of the moving member 3 to the external and is supported by a rotary support member not shown.

FIG. 3 shows an electrode pattern formed on the piezoelectric element 1, which is made up of electrodes 1a and 1b to which AC voltages having different phases are applied, and an electrode 1c for detecting the vibration state of the elastic member 2. Also, the insides of the electrodes 1a and the electrodes 1b are polarized circumferentially in opposite directions to each other and in the thickness direction. The following is an example using the vibration type actuator with the annular elastic member. The present invention is effective to the vibration type actuator that includes a vibration member made up of an exciting means and an elastic member, and a moving member that is brought in pressure contact with the vibration member, in which the moving member moves due to the vibration formed in the vibration member due to the exciting means, regardless of the structure of the actuator.

Hereinafter, the block diagram shown in FIG. 1 will be described. Referring to FIG. 1, reference numeral 5 denotes a two-phase drive circuit that inputs a two-phase pulse signal, outputs a pulse voltage in accordance with the pulse signal from an output of a half bridge structure, and applies an AC voltage of a waveform close to a sine wave to the electrodes 1a and 1b of the piezoelectric element through inductors L1 and L2.

Also, in the drive circuit 5, a supply voltage is controlled by a voltage control means 7 that will be described later, as a result of which the output voltage amplitude of the half bridge changes due to the voltage control means 7.

Reference numeral 6 denotes a voltage-change speed detecting means for detecting an inclination amount (voltage change speed) of the voltage waveform close to the waveform center of the AC voltage which is applied to the electrode 1a, and reference numeral 7 denotes a voltage control means for controlling the supply voltage of the drive circuit 5 in accordance with a result of comparing the output of the voltage-change speed detecting means 6 with a voltage-change speed command from a command means not shown.

The voltage control means 7 is so designed as to make the supply voltage of the drive circuit 5 higher, make the voltage amplitude which is applied to the electrode 1a larger, and make the output of the voltage-change speed detecting means 6 equal to the voltage-change speed command, in the case where the output of the voltage-change speed detecting means 6 is smaller than the voltage-change speed command.

Also, reference numeral 8 denotes a vibration speed detecting means for detecting the inclination amount (vibration speed) of the waveform center of an AC voltage outputted from the vibration state detection electrode 1c of the elastic member 2. Reference numeral 9 denotes a two-phase output pulse control means for comparing the vibration speed command from the command means not shown with the output of the vibration speed detecting means 8 and controlling the frequency so as to make the vibration speed command and the output of the vibration speed detecting means 8 equal to each other. A relationship between the drive frequency and the drive speed is that a high frequency side is used as a drive region with a resonance frequency as a boundary, and the drive speed is made lower as the frequency becomes higher.

The pulse control means 9 is so designed as to change the frequency of the two-phase pulse signal to be higher, to make the vibration speed lower by making the drive frequency far from the resonance frequency of the elastic member, and to make the output of the vibration speed detecting means 8 equal to the vibration speed command in the case where the output of the vibration speed detecting means 8 is larger than the vibration speed command.

Figure 4:
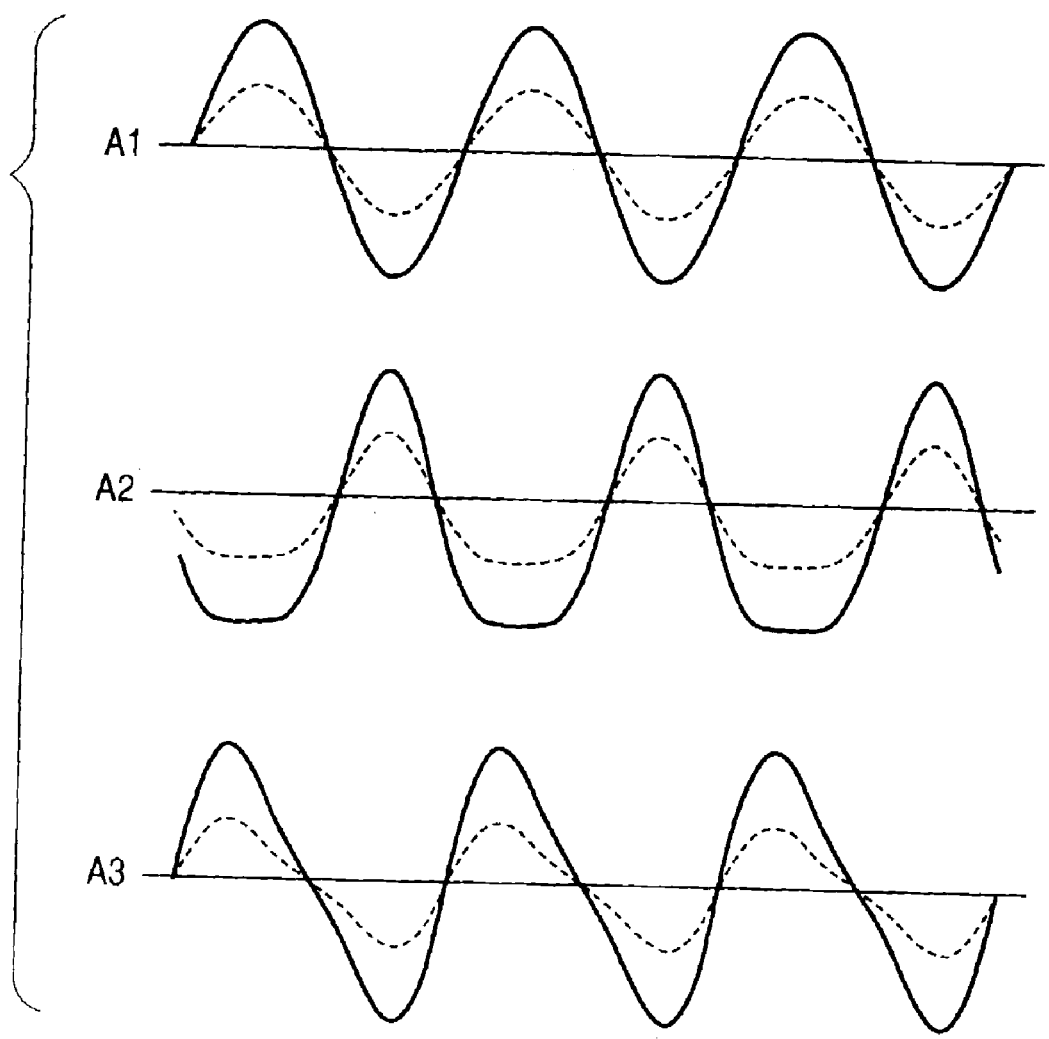
FIG. 4 is a graph showing an example of a voltage waveform, which is applied to the piezoelectric element.

FIG. 4 shows an example of the voltage waveform, which is applied to the electrode 1a.

Referring to FIG. 4, reference symbol A1 represents a sine wave, A2 represents a vertically asymmetric waveform, and A3 represents a waveform, which is vertically symmetric, but whose rising edge and falling edge are not symmetric. The solid line and the broken line of each waveform exhibit waveforms different in amplitude. Since the voltage change speed is the inclination amount in the center of the waveform, the inclination of each waveform in the vicinity of the center line is detected.

As is understood from the figure, the broken-line waveform smaller in the amplitude is smaller in voltage change speed than the solid-line waveform larger in the amplitude, and if the waveform does not change, the voltage change speed and the amplitude are proportional to each other. However, in a practical sense, because the pulsed voltage waveform is smoothed through the inductors L1 and L2, and the AC voltage is applied to the electrodes 1a and 1b, and the waveform changes due to a change in the drive frequency, the voltage change speed is not proportional to the amplitude.

However, the change in the voltage amplitude which is applied to the electrodes 1a and 1b due to the change in the drive frequency can be reduced to some degree by controlling the voltage change speed, thereby being capable of improving the circuit efficiency. In a system using a battery power supply, the consumption of the battery can be suppressed, and the circuit efficiency is particularly improved.

Also, since the rising inclination and the falling inclination of each waveform shown in FIG. 4 are different in sign, it is possible to set the absolute value of the inclination to the voltage change speed, or use only one inclination information. Also, if a plurality of detected inclination amounts is averaged to obtain an inclination, an influence of the noises can be suppressed.

Also, in the case where the rising waveform and the falling waveform are not symmetrical with each other as with the waveform A3, it is necessary to add the same number of absolute values of the rising inclination and the falling inclination, and average the added absolute values, respectively. Also, strictly speaking, since the inclination is different even with the same waveform when the drive frequency changes, a rate of the change in the vibration amplitude and the change in the vibration speed can be made to approach each other by correcting the inclination. The following is a relational expression assuming that the amplitude of the vibration waveform is V, a vibration period is T, and the vibration speed is $\Delta V$.

$$\Delta V = \frac{d}{dt}V\sin\left(\frac{2\pi}{T}t\right) = \frac{2\pi}{T}V\cos\left(\frac{2\pi}{T}t\right)$$

Here, when t=0, $$\Delta V = \frac{2\pi}{T}V$$

Therefore, $$V = \frac{\Delta V T}{2\pi}$$

It is found from the above expression that the vibration amplitude V is in proportion to the multiplication result of the vibration speed $\Delta V$ and the vibration period T. This result is applied to a case of an ideal sine wave. However, even in the waveform which slightly changes in accordance with the change of another waveform or the frequency, if a correction calculation in which the vibration speed $\Delta V$ which is detected by the vibration speed detecting means 8 is multiplied by the vibration period T is conducted, it is possible to enhance an estimated precision of the vibration amplitude V.

Figure 5:
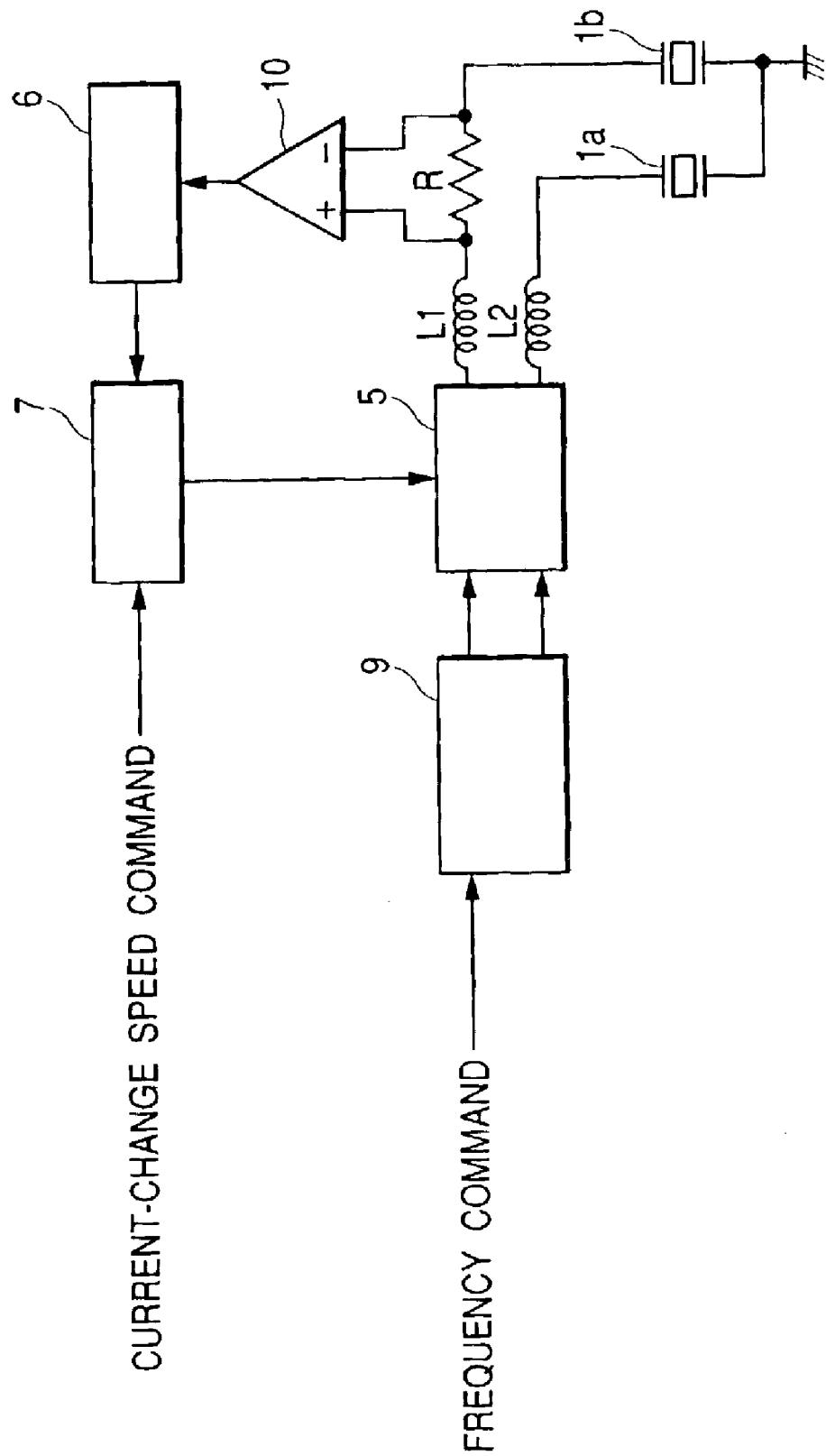
FIG. 5 is a block diagram showing a control device in accordance with a second embodiment of the present invention.

FIG. 5 is a block diagram showing a control circuit in a second embodiment.

Referring to FIG. 5, reference numeral 10 denotes a current detection amplifier that detects a potential difference between both ends of a current detection resistor R, and the current detection amplifier 10 detects a voltage drop caused by making a current flowing in the electrode 1b of the piezoelectric element 1 flow in the resistor R and outputs a voltage waveform in accordance with the waveform of the current.

The output of the current detection amplifier 10 is inputted to the voltage-change speed detecting means 6, the voltage of a value (current change speed) corresponding to the inclination of the current waveform that flows in the resistor R in the vicinity of the center thereof is outputted from the voltage-change speed detecting means 6. The output of the voltage-change speed detecting means 6 is compared with the current-change speed command from the command means not shown by the voltage control means 7, to control the supply voltage of the drive circuit 5.

In this example, in the case where the current change speed is smaller than the current-change speed command, control is made in such a manner that the supply voltage of the drive circuit 5 is made larger, the currents that flow in the electrode 1a and the electrode 1b are made to increase, and the current change speed and the current-change speed command become equal to each other.

Also, the pulse control means 9 outputs to the drive circuit 5 two-phase pulse signals of a frequency according to the frequency command from the command means not shown. The drive circuit 5 outputs the two-phase pulse signals that are pulses corresponding to the pulse signals from the pulse control means 9 and whose pulse amplitude changes due to the supply voltage from the power supply control means 7. The two-phase pulse signals apply the AC voltage to the piezoelectric element 1 through the inductors L1 and L2. The resistor R is inserted in a path connected to the electrode 1b among them, and the current that flows in the electrode 1b is converted into a voltage. In this example, the current that flows in the one phase is detected, but the sum of the two-phase currents may be detected.

Figure 6:
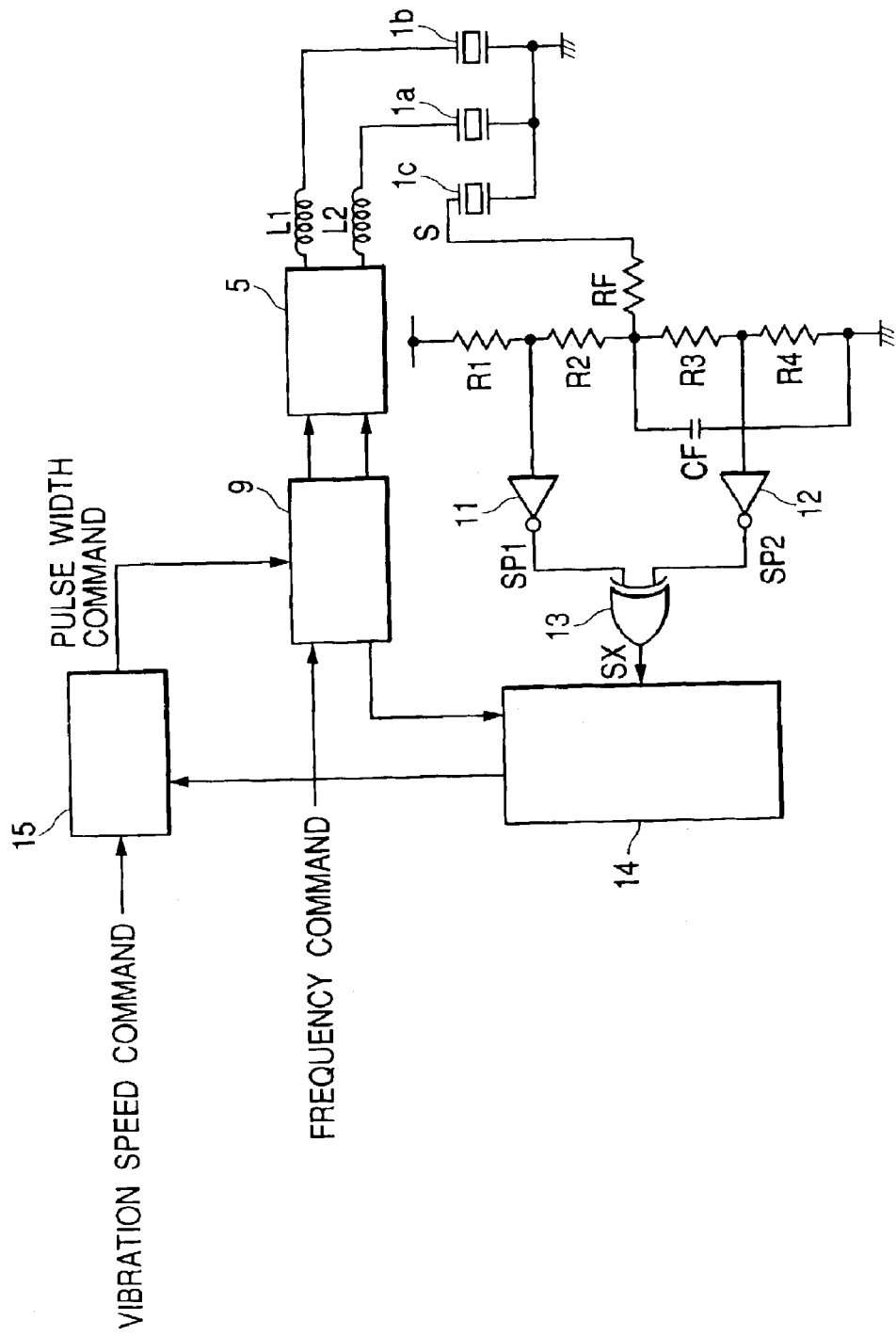
FIG. 6 is a block diagram showing a control device in accordance with a third embodiment of the present invention.

FIG. 6 is a block diagram showing a control circuit in accordance with a third embodiment of the present invention.

Referring to FIG. 6, the control device according to this embodiment is so designed as to detect the inclination (vibration speed) of an AC signal in the vicinity of the center thereof in accordance with the vibration state of the elastic member 2 which is outputted from the electrode 1c of the piezoelectric element 1 and control the amplitude of the AC voltage which is applied to the piezoelectric element 1 so that the detected inclination becomes a given vibration speed.

When a voltage waveform S that depends on the vibration state of the elastic member 2 not shown is outputted from the electrode 1c of the piezoelectric element 1, a high-frequency noise contained in the AC signal outputted from the electrode 1c is removed by a low-pass filter made up of resistors RF, R1, R2, R3, R4 and a capacitor CF, and a voltage resulting from superimposing a DC offset voltage on the AC signal is inputted to CMOS invertors 11 and 12. The CMOS invertors 11 and 12 convert the analog-like voltage waveforms into digital-like pulse waveforms SP1 and SP2 with the voltage half of the supply voltage VCC as a threshold value.

The DC level of the voltage which is inputted to the CMOS inverter 11 and the DC level of the voltage which is inputted to the CMOS inverter 12 are different values, but are values shifted up and down by a slight amount of voltages ΔS with the voltage half of the supply voltage VCC as a boundary. The resistors R1, R2, R3 and R4 are set to R=R4, R2=R3 so that the amplitude of the AC voltage is so divided as to provide the same amplitudes.

The signals SP1 and SP2 are inputted to an exclusive OR element 13 and an exclusive OR element 13 outputs the pulse signal SX to detect the shift of the pulse edges of the signal SP1 and the signal SP2.

Figure 7:
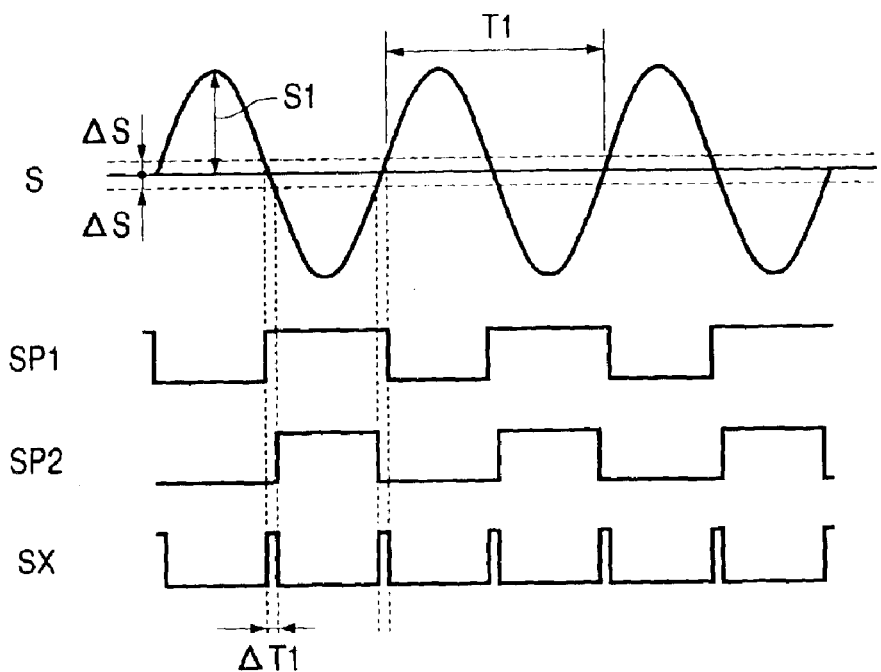
FIG. 7 is a timing chart showing the waveforms of the respective portions in accordance with the third embodiment of the present invention.
Figure 8:
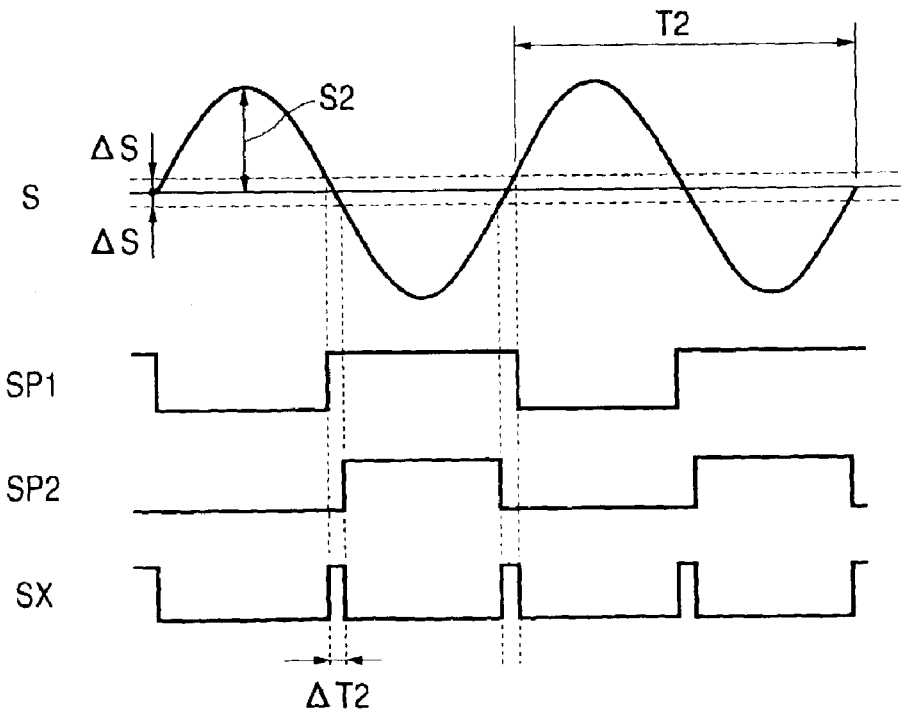
FIG. 8 is a timing chart showing the waveforms of the respective portions in accordance with the third embodiment of the present invention.

FIGS. 7 and 8 show the waveforms of the respective portions. FIGS. 7 and 8 show a case in which the frequencies of the AC signal S are different from each other. The amplitude S1 and the amplitude S2 of the AC signal S shown in FIGS. 7 and 8 are the same amplitudes, and the AC signal S is compared with the voltages which are shifted up and down with respect to the center of the waveform by ΔS, and is outputted as the signals SP1 and SP2 from the CMOS inverters 11 and 12, and a signal SX is obtained by inputting the signal SP1 and the signal SP2 to the exclusive OR element 13.

The pulse widths ΔT1 and ΔT2 of the signal SX correspond to the inverse number of the inclination of a line that connects points at which the waveform crosses the levels separated up and down from the waveform center of the AC signal S by ΔS, and ΔT1 and ΔT2 become smaller as the amplitude of the AC signal S is larger. Also, ΔT2 is larger than ΔT1, which corresponds to the ratio of the period T1 and the period T2.

Returning to the description of FIG. 6, reference numeral 14 denotes a counter that measures the pulse width of the output signal SX of the exclusive OR element 13, and counts up a period of time during which the signal SX is high level during a period of time which is the integer times of the half period of the AC signal S on the basis of the signal from the pulse control means 9.

Reference numeral 15 denotes a pulse width control means that compares the inverse number of the vibration speed command from the command means not shown with the output of the counter 14 to output a pulse width command to the pulse control means 9.

The pulse control means 9 outputs two-phase pulse signals in accordance with the pulse width command from the pulse width control means 15 and the frequency command from the command means not shown, and outputs the pulse signals to the drive circuit 5.

In this example, in the case where the vibration speed of the vibration detection signal from the electrode 1c is smaller than the vibration speed command, the output of the counter 14 becomes a large value and becomes larger than the inverse number of the vibration speed command. Then, the pulse width control means 15 increases the pulse width command, and increases the voltage amplitude, which is applied to the electrodes 1a and 1b of the piezoelectric element 1 so that the vibration speed increases and becomes equal to the vibration speed command.

In this example, the inverse number of the vibration speed command is compared with the output of the counter 14, but the inverse number of the output of the counter 14 may be compared with the vibration speed command. Also, FIGS. 7 and 8 show that the values of ΔT1 and ΔT2 differ from each other due to a difference in the frequency of the AC signal S, but this influence can be corrected by dividing the output of the counter 14 by the period information of the AC signal S.

The detailed description of the pulse width control means 15 is omitted from the above description. However, it is apparent that more stable control is possible by obtaining a difference between the output signal of the counter 14 and the inverse number of the vibration speed command from the command means not shown, conducting an arithmetic operation by using a PID operation or the like, and determining the pulse width command.

Figure 9:
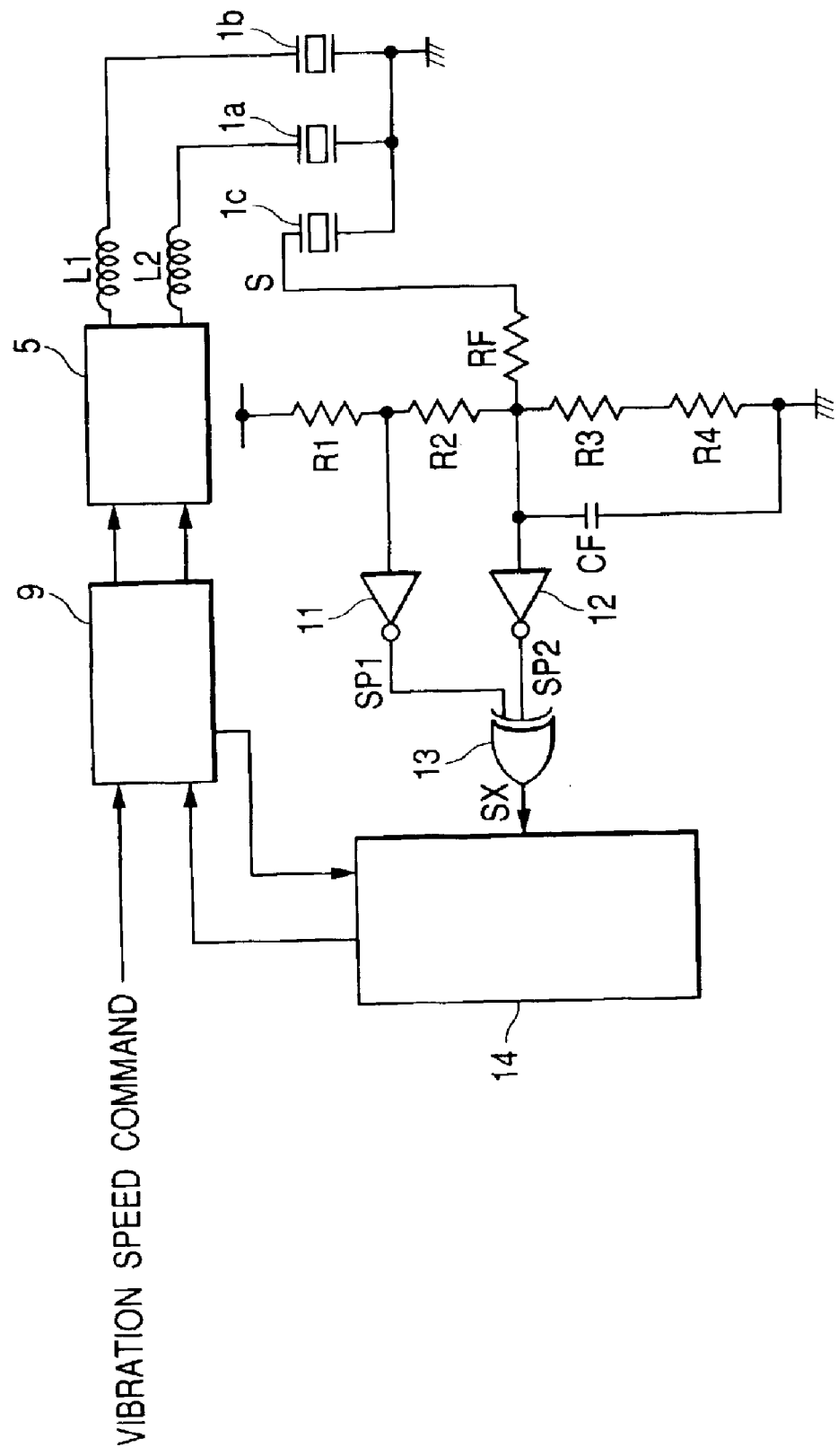
FIG. 9 is a block diagram showing a control device in accordance with a fourth embodiment of the present invention.
Figure 10:
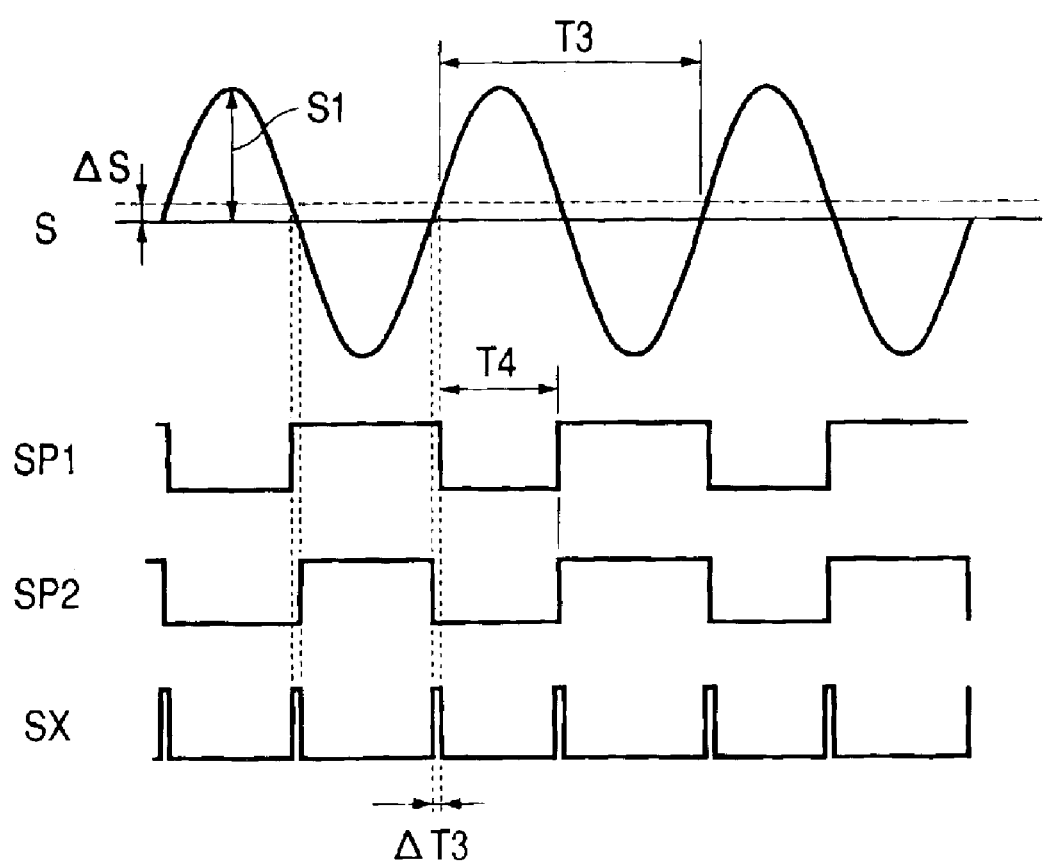
FIG. 10 is a timing chart showing the waveforms of the respective portions in accordance with the fourth embodiment of the present invention.

FIGS. 9 and 10 show a fourth embodiment of the present invention. FIG. 9 is a block diagram of a control device illustrating the fourth embodiment of the present invention. FIG. 10 shows the waveforms of the respective portions of FIG. 9.

In the above-mentioned third embodiment, the inclination of the AC signal S is obtained by the result of comparing the AC signal S with two comparative values, which are symmetric with respect to the waveform center as a boundary. In this embodiment, the inclination of the signal S is obtained by the pulse waveform having the waveform center as the comparative value and the pulse waveform, which is compared with the level, offset with respect to the waveform center.

FIG. 10 shows the waveforms of the respective portions shown in FIG. 9. In principle, as in the third embodiment, in the case where the waveform of the AC signal S is vertically symmetrical, when using two values obtained by providing the comparative values with the offsets of the same amount up and down with respect to the waveform center of the AC signal S, or when using two values providing the comparative values with the offsets on the waveform center and only the one side thereof, the inclination of a line that connects points at which the AC signal S crosses those two values is equal to each other.

In this embodiment, the output of the counter 14 and the inverse number of the vibration speed command from the command means not shown are compared with each other by the pulse control means 9, and the frequency of the two-phase pulse signals is controlled in accordance with the comparison result.

In this example, in the case where the vibration speed of the AC signal S is smaller than the vibration speed command, because the frequency of the two-phase pulse signals which are outputted from the pulse control means 9 is changed to be low, and the frequency of the AC voltage which is applied to the piezoelectric element 1 approaches the resonance frequency of the vibration of the vibrator which is formed of the elastic member 2 and the piezoelectric element 1, the vibration speed increases so as to be equal to the vibration speed command.

Figure 11:
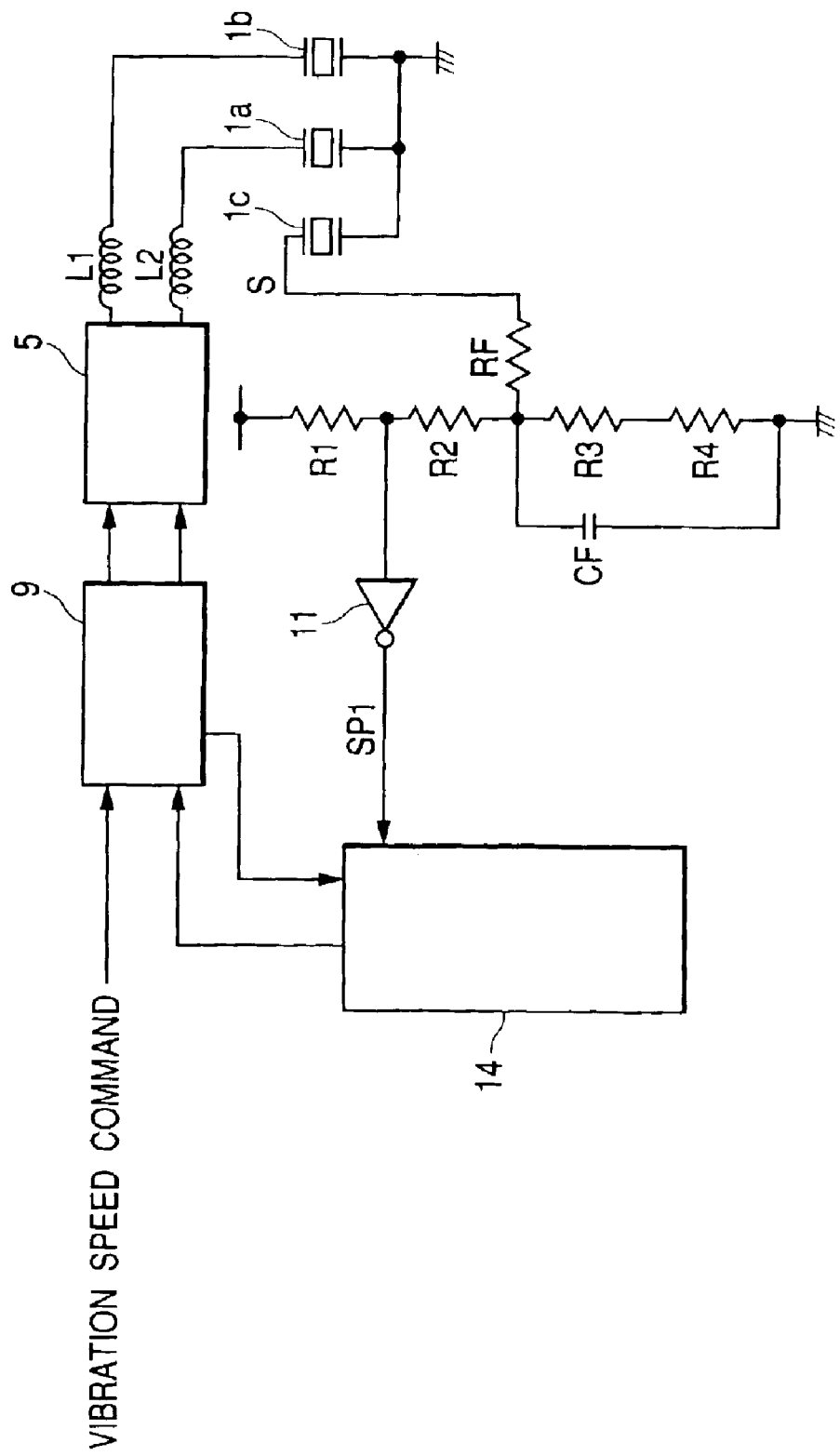
FIG. 11 is a block diagram showing a control device in accordance with a fifth embodiment of the present invention.

Also, as is understood from FIG. 10, the value of ΔT3 representative of the interval of the pulse edges of the signal SP1 and the signal SP2 can be obtained even by another method. This is a method in which the pulse width T4 of the signal SP1 is measured, and T4 is subtracted from the half value of the period T3 of the AC signal S to obtain ΔT3. In this method, the CMOS inverter 12 and the exclusive OR element 13 are deleted so as to provide a fifth embodiment of the present invention as shown in FIG. 11, thereby being capable of slightly reducing the circuit scale. In this case, in the pulse control means 9, it is necessary to subtract the half value of the period of the output pulse from the counter information from the counter 14 and compare the subtracted value with the inverse number of the vibration speed command.

FIGS. 12 to 15 show a sixth embodiment of the present invention.

Figure 12:
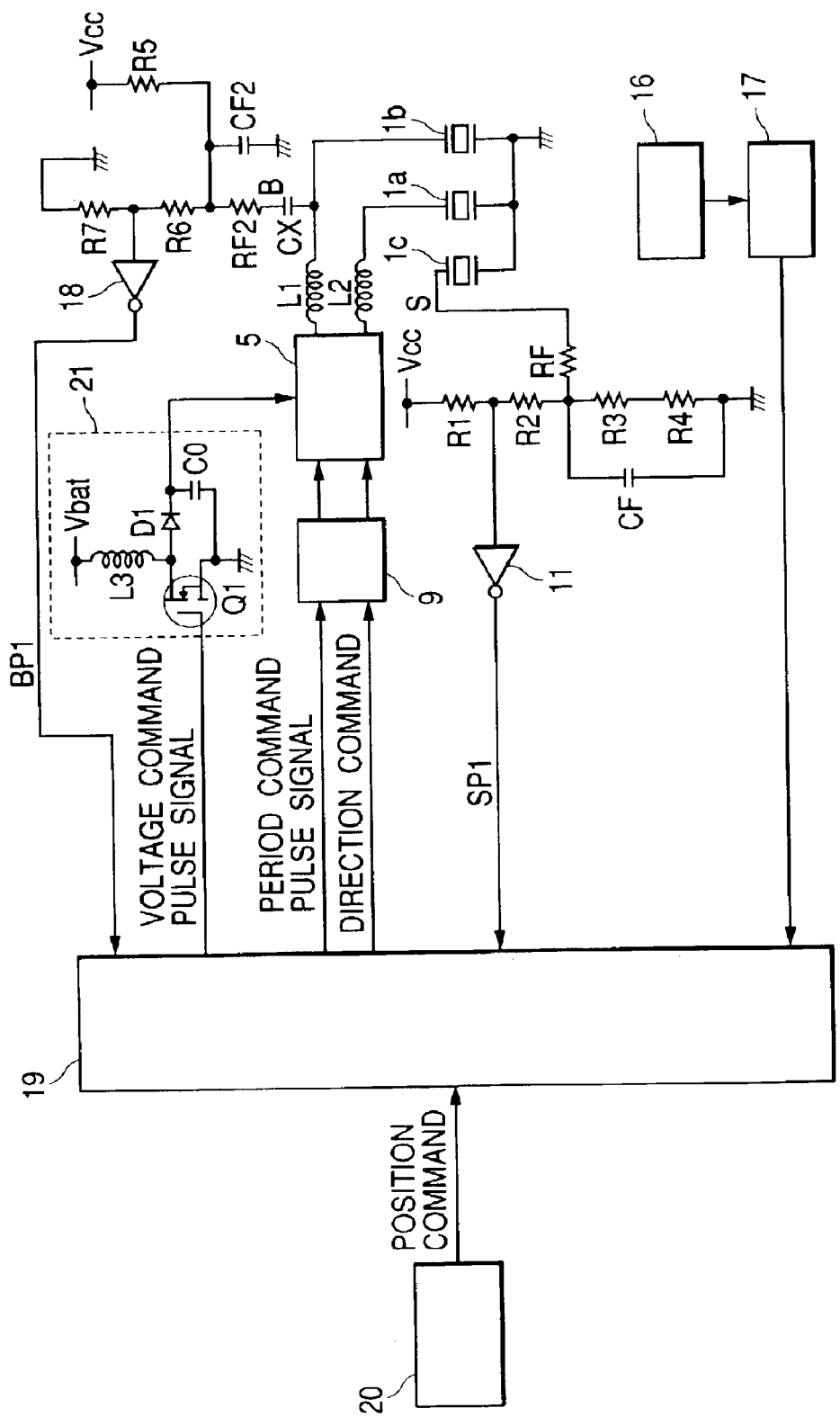
FIG. 12 is a block diagram showing a control device in accordance with a sixth embodiment of the present invention.

FIG. 12 is a block diagram showing the control device in accordance with the sixth embodiment of the present invention.

In this embodiment, a rotary encoder 16 that will be described later is used to detect the position of a moving member not shown, and the moving member is so controlled as to comply with the position command from the position command means 20 which will be described later. Also, the embodiment also includes a structure in which the applied voltage to the piezoelectric element 1 is controlled to a desired value, and a structure in which the vibration speed is detected and controlled to a desired value. Hereinafter, the detailed description of FIG. 12 will be given. The control loop of the vibration speed will be first described, the control loop of the applied voltage is then described, and the operation of the position control loop including those control loops will be finally described.

A CPU 19 outputs a period command pulse signal to the pulse control means 9. This is a pulse signal having a frequency that is four times of the two-phase pulses. The pulse control means 9 divides this signal and outputs the two-phase pulse signals different in phase by 90°. The drive circuit 5 conducts a power amplification on pulse signals corresponding to the two-phase pulse signals and supplies them to the electrodes 1a and 1b of the piezoelectric element 1 through the inductances L1 and L2. The resultantly generated vibration of the elastic member 2 not shown is detected by the electrode 1c of the piezoelectric element 1. Thereafter, the detected vibration is converted into the pulse signal SP1 by the CMOS inverter 11 through the resistors RF, R1, R2, R3, R4 and CF.

As described in the above-mentioned sixth embodiment, for detection of the vibration speed, if the pulse width of the signal SP1 is detected by the internal timer function of the CPU 19, and a value corresponding to a period which is twice of the period command pulse signal to the pulse control means 9 is subtracted from the pulse width of the signal SP1, a value corresponding to the inverse number of the vibration speed of the AC signal S can be obtained.

The inverse number (SD) of that value is subtracted from the vibration speed command (SS) which is set as a result of a position control calculation which will be described later, a period corresponding to the sum of a result of integrating the subtracted value and a predetermined initial period (T0) is obtained, a frequency that is four times of the frequency of the AC voltage which is applied to the piezoelectric element 1 is determined, and the period command pulse signal of the period (T) corresponding to the determined frequency is outputted to the pulse control means 9 by using the internal timer function of the CPU 19.

Also, the on/off state of the period command pulse signal is changed over in accordance with the on/off command set as a result of the position control calculation.

Figure 13:
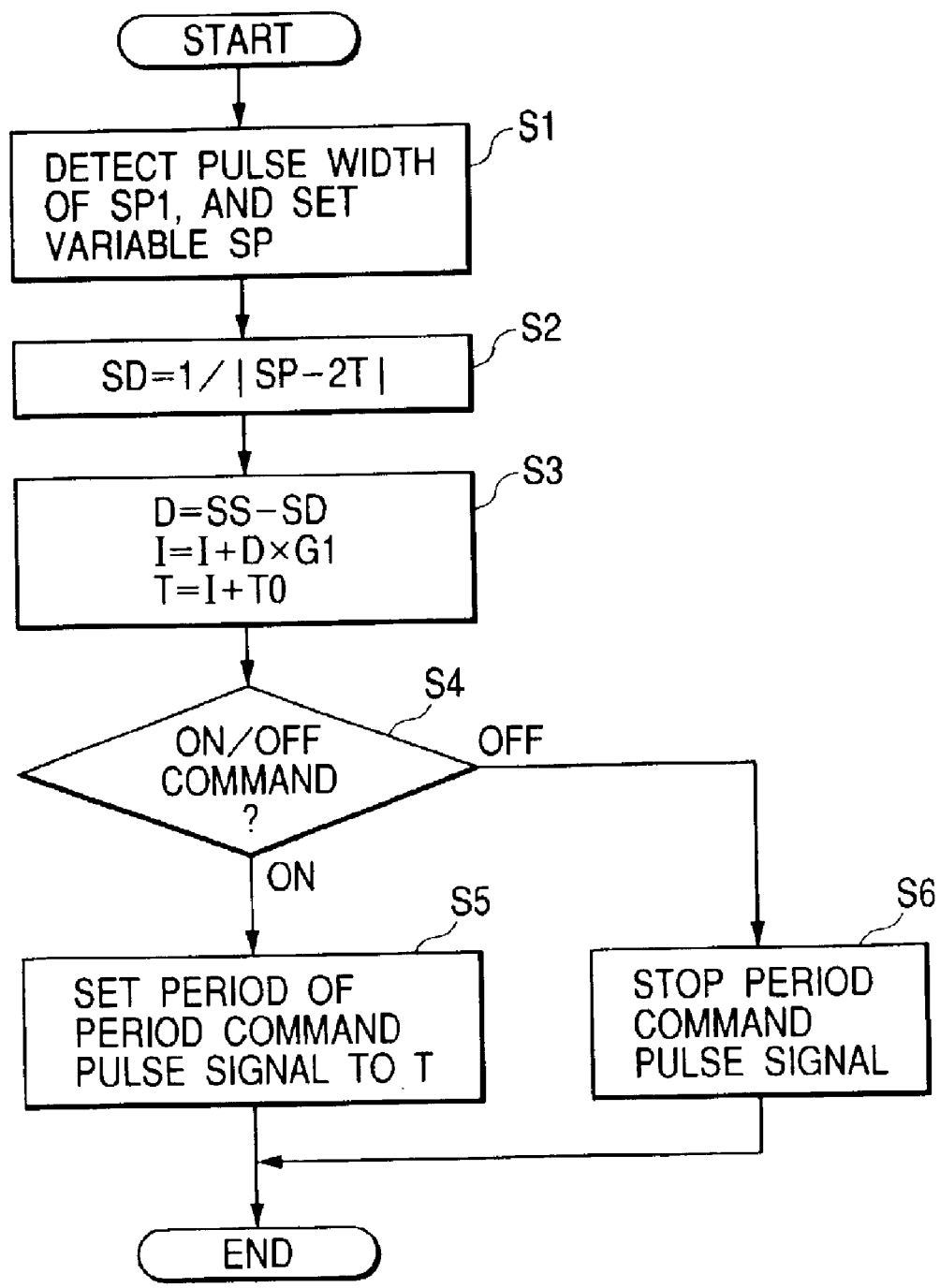
FIG. 13 is a flowchart showing the operation of a vibration speed control portion in accordance with the sixth embodiment of the present invention.

FIG. 13 shows a flowchart of the vibration speed control portion, which will be described below.

In S1, the CPU 19 detects the pulse width of the signal SP1 and substitutes the detected pulse width into a variable SP.

In S2, the CPU 19 subtracts a value, which is twice of the period T of the pulse signal of the above four-times frequency from the variable SP, and substitutes the inverse number of the absolute value into a variable SD.

In S3, the CPU 19 subtracts the variable SD from the vibration speed command SS, and substitutes that value into a variable D. Then, the CPU 19 integrates an integration variable I by a value resulting from multiplying a gain G1 by the variable D. In addition, the CPU 19 adds an integration variable I and an initial period T0 to the period T.

Then, if the on/off command is on as a result of the position control calculation which will be described later in S4, the CPU 19 outputs the pulse signal of the period T as the period command pulse signal to the pulse control means 9 in S5.

On the contrary, if the on/off command is off in S4, the CPU 19 stops the period command pulse signal in S6.

Then, the control loop of the applied voltage will be described.

The applied voltage control loop controls the voltage change speed of the AC voltage, which is applied, to the electrode 1b of the piezoelectric element 1. The voltage that is applied to the electrode 1a becomes substantially the same voltage change speed as that of the voltage applied to the electrode 1b although it is slightly different depending on the fixed number of the respective parts. A capacitor CX is so designed as to cut off the DC component of the voltage, which is applied to the electrode 1b, and a capacitor CF2 is a capacitor for removing a high-frequency noise. Also, the resistors RF, R2, R5, R6 and R7 determine the respective cutoff frequencies of the DC component cut and high-frequency noise removal, and superimpose the divided voltage of the AC signal B and the offset voltage on each other.

Reference numeral 18 denotes a CMOS inverter, which converts an analog signal to the pulse signal BP1 with the voltage half of the supply voltage VCC as a threshold value. In this case, the divided ratio is determined so that the input voltage of the CMOS inverter 18 is not larger than the supply voltage VCC and not lower than a ground level, and structured in such a manner that the CMOS inverter is not latched up.

The pulse signal BP1 is inputted to the CPU 19, and the pulse width is obtained by the internal timer function of the CPU 19. The period value which is twice of the period command pulse signal to the pulse control means 9 is subtracted from the obtained pulse width, thereby being capable of obtaining a value corresponding to the inverse number of the voltage change speed in the waveform center of the voltage applied to the electrode 1b, as in the vibration speed detection. The inverse number (BD) of the obtained value is subtracted from the voltage-change speed command (BS) which is set as a result of the position control calculation which will be described later to output the voltage command pulse signal of the pulse width (P) corresponding to the subtraction result. The frequency of the voltage command pulse signal is a frequency, which is at least equal to or higher than the frequency of the applied voltage, and may be, for example, the same frequency as the period command pulse signal. In case of the same frequency as the period command pulse signal, the voltage command pulse signal and the period command pulse signal can be set as an identical signal.

The voltage command pulse signal is inputted to a DC voltage generating means 21 which is made up of a MOS-FET Q1, an inductor L3, a diode D1 and a capacitor CO. A voltage VBAT from a battery not shown steps up, and the supply voltage of the drive circuit 5 is supplied. That is, in the case where the supply voltage of the drive circuit 5 is made large, control is made by the CPU 19 so as to widen the pulse width of the voltage command pulse signal, which is inputted to the gate of the MOSFET Q1.

Figure 14:
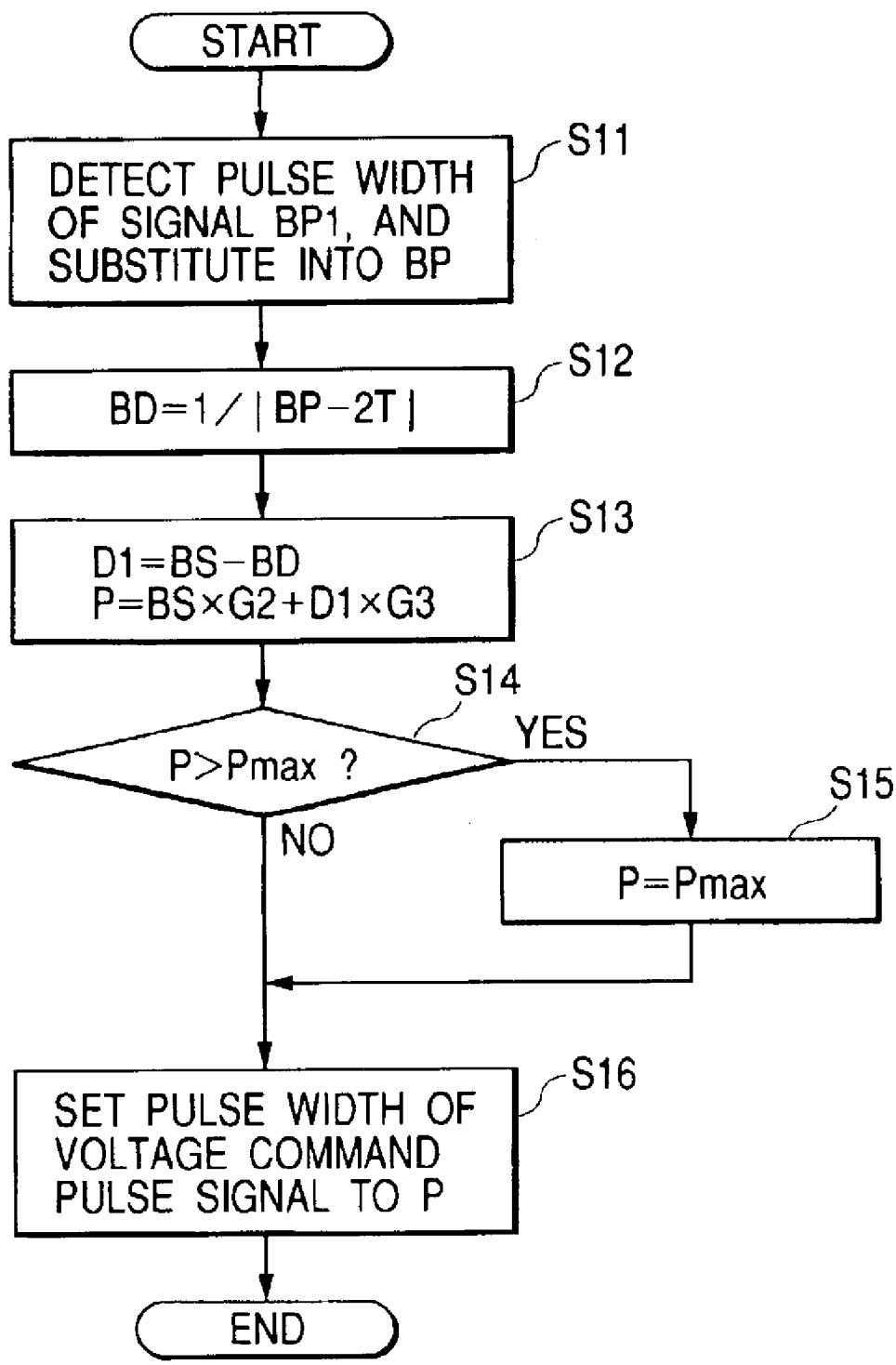
FIG. 14 is a flowchart showing the operation of a voltage-change speed control portion in accordance with the sixth embodiment of the present invention.

FIG. 14 shows a flowchart of the voltage-change speed control portion, which will be described below.

In S11, the CPU 19 detects the pulse width of a signal BP1 and substitutes the detected pulse width into a variable BP.

In S12, the CPU 19 subtracts a value, which is twice of the period T of the period command pulse signal from the variable BP, and substitutes the inverse number of the absolute value of the resultant value into a variable BD.

In S13, the CPU 19 subtracts the variable BD from the voltage-change speed command BS, and substitutes that value into a variable D1. Then, the CPU 19 adds a value resulting from multiplying the voltage-change speed command BS by a gain G2 and a value resulting from multiplying the variable BD by a gain G3 to determine a pulse width P.

Then, in S14, the CPU 19 judges whether the pulse width P is larger than a maximum pulse width Pmax, or not, and if larger, the CPU 19 substitutes the maximum pulse width Pmax into the pulse width P in S15, and if the pulse width P is smaller than the maximum pulse width Pmax, the CPU 19 outputs a signal having the same frequency as the frequency of the period command pulse signal and the pulse width corresponding to the pulse width P to the DC voltage generating means 21 as the voltage command pulse signal.

Then, the position control loop will be described.

In FIG. 12, reference numeral 16 denotes an optical encoder for detecting the amount of movement of the moving member 3 not shown, and reference numeral 17 denotes a counter for counting the pulses of the optical encoder 16 to detect the position of the moving member 3.

Also, reference numeral 20 denotes a position command means that outputs a position command to the CPU 19, which is, for example, of a type in which a voltage is outputted corresponding to the falling angle of a stick such as a joy stick, of a dial type, or of a type in which the operation amount is outputted in accordance with the motion of human's hand such as an optical mouse.

The CPU 19 inputs the position command from the position command means 20 by using the A/D conversion function or the pulse count function. The position command and the output of the counter 17 are compared with each other by the CPU 19 every given period of time, and a direction command is set by the sign of the comparison result. In the case where the comparison result is equal to each other, the CPU 19 stops the frequency command pulse signal to the pulse control means 9 and stops the vibration type actuator. Hereinafter, a description will be given of a calculating method of the vibration speed command and the voltage-change speed command.

First, the vibration speed command will be described.

The vibration speed command is determined by conducting a PI calculation on a difference between the position command from the position command means 20 and the position of the moving member 3, which is detected by the counter 17. If occasion demands, there is a case in which a given value is added to the determined vibration speed command so that an insensitive region of the moving speed of the moving member 3 with respect to the vibration speed is compensated.

Also, the voltage-change speed command is set to a value proportional to the vibration speed command or the value added with a given value.

Figure 15:
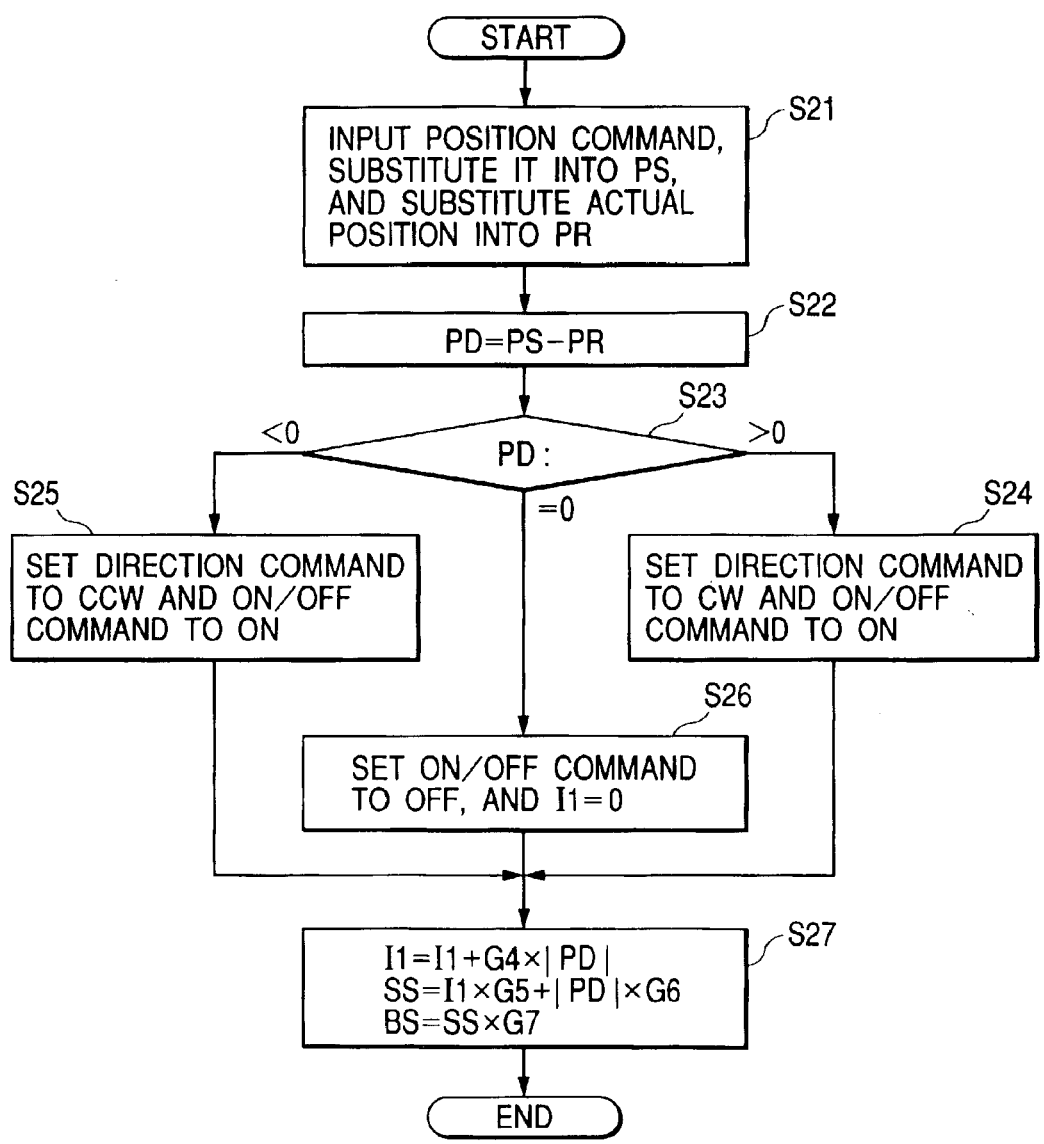
FIG. 15 is a flowchart showing the operation of a position control portion in accordance with the sixth embodiment of the present invention.

FIG. 15 shows a flowchart of the position control portion, which will be described below.

In S21, the CPU 19 inputs the position command PS from the position command means 20, and inputs a present position PR from the counter 17.

In S22, the CPU 19 subtracts the present position PR from the position command PS and substitutes the subtraction result into the variable PD.

If the variable PD is a positive value in S23, the CPU 19 sets the direction command to CW in S24, and if the variable PD is a negative value, the CPU 19 sets the direction command to CCW in S25. Further, the CPU 19 turns on the on/off command in both cases where the variable PD is positive or negative.

Also, if the variable PD is 0 in S23, the CPU 19 turns off the on/off command in S26, and sets the integration variable I1 to 0.

Then, in S27, the CPU 19 integrates a value resulting from multiplying the absolute value of the variable PD by the gain G4 by the integration variable I1. The integration variable I1 is multiplied by the gain G5, and a value resulting from multiplying the absolute value of the variable PD by the gain G6 is added to the multiplied integration variable and substituted into the vibration speed command SS. A value resulting from multiplying the vibration speed command SS by a gain G7 is substituted into the voltage-change speed command BS.

In this way, the target values of the voltage change speed and the vibration speed are set by the calculation of the position control loop, and the moving member 3 of the vibration type actuator is controlled by the respective control loops so as to move in accordance with the position command from the position command means 20 and move in accordance with the position command.

The present invention is not limited to the above embodiments and various changes and modifications can be made within the spirit and scope of the present invention. Therefore, to apprise the public of the scope of the present invention the following claims are made.

What is claimed is:

1. A control device for a vibration-type actuator having an elastic member fixed with an electro-mechanical energy conversion element, and a vibration member that generates a vibration on a surface of the elastic member by supplying a drive signal to the electro-mechanical conversion element, the control device comprising:

a drive circuit that supplies a periodic signal to the electro-mechanical energy conversion element;

a state detecting circuit that detects a drive state of the vibration member and outputs a waveform signal representing the detected drive state;

an inclination detecting circuit that detects an inclination of at least one of a rising region and a falling region of a waveform at a predetermined level defined in accordance with an amplitude of the waveform signal; and a control circuit that controls the drive circuit on the basis of an unput signal from the inclination detecting circuit.

2. A control device according to claim 1, wherein the predetermined level is a center level of the waveform.

3. A control device according to claim 1, wherein the inclination detecting circuit detects the inclination of the waveform corresponding to at least one of a voltage waveform of the periodic signal, a current waveform that flows in the vibration-type actuator, and a vibration waveform of the vibration-type actuator.

4. A control device according to claim 1, further comprising a correcting circuit to which an output signal is inputted from the inclination detecting circuit corrects an influence due to a period of the waveform signal.

5. A control device for a vibration-type actuator having an elastic member fixed with an electro-mechanical energy conversion element, and a vibration member that generates a vibration on a surface of the elastic member by supplying a drive signal to the electro-mechanical conversion element, the control device comprising:
- a drive circuit that supplies a periodic signal to the electro-mechanical energy conversion element;
- a state detecting circuit that detects a drive state of the vibration member and outputs a waveform signal representing the detected drive state;
- a comparing circuit that compares the waveform signal with a predetermined threshold value;
- a calculating circuit that calculates a value in accordance with a difference between a pulse width of a pulse signal outputted from the comparing circuit and time of a half period of the periodic signal; and
- a control circuit that controls the drive circuit on the basis of an output signal from the calculating circuit.

6. A control device according to claim 5, wherein the calculating circuit obtains a difference between a pulse width of the pulse signal and a time of a half period of the periodic signal, and obtains an inverse number of the difference.

7. A control device according to claim 5, wherein the comparing circuit compares the waveform signal corresponding to at least one of a voltage waveform of the periodic signal, a current waveform that flows in the vibration-type actuator, and a vibration waveform of the vibration-type actuator with the predetermined threshold value.

8. A control device according to claim 5, further comprising a correcting circuit that inputs an output signal from the calculating circuit and corrects an influence due to a period of the waveform signal.

9. A control device for a vibration-type actuator having an elastic member fixed with an electro-mechanical energy conversion element, and a vibrator that generates a vibration member on a surface of the elastic member by supplying a drive signal to the electro-mechanical conversion element, the control device comprising:
- a drive circuit that supplies a periodic signal to the electro-mechanical energy conversion element;
- a state detecting circuit that detects a drive state of the vibration member and outputs a waveform signal representing the detected drive state;
- a comparing circuit that compares the waveform signal with a predetermined plurality of threshold values;
- a calculating circuit that outputs a value in accordance with an edge interval between a plurality of pulse signals which are outputted by the comparing circuit; and
- a control circuit that controls the drive circuit on the basis of an output signal from the calculating circuit.

10. A control device according to claim 9, wherein plurality of threshold values are two threshold values.

11. A control device according to claim 10, wherein the calculating circuit obtains an edge interval between two pulse signals which are outputted from the comparing circuit, and obtains an inverse number of the interval.

12. A control device according to claim 9, wherein the comparing circuit compares the waveform signal corresponding to at least one of a voltage waveform of the periodic signal, a current waveform that flows in the vibration-type actuator, and a vibration waveform of the vibration type actuator with the predetermined plurality of threshold values.

13. A control device according to claim 9, further comprising a correcting circuit that inputs an output signal from the calculating circuit and corrects an influence due to a period of the waveform signal.

14. A control method for controlling a vibration-type actuator having an elastic member fixed with an electro-mechanical energy conversion element, and a vibration member that generates a vibration on a surface of the elastic member by supplying a drive signal to the electro-mechanical conversion element, the control method comprising the steps of:
- supplying a periodic signal to the electro-mechanical energy conversion element;
- detecting a drive state of the vibration member;
- outputting a waveform signal representing the drive state detected in the step of detecting a drive state;
- detecting an inclination of at least one of a rising region and a falling region of a waveform at a predetermined level in accordance with an amplitude of the waveform of the waveform signal; and
- controlling the operation of the supplying step on the basis of an output signal from the step of detecting an inclination.

15. A control method according to claim 14, wherein the predetermined level is a center level of the waveform.

16. A control method for controlling a vibration-type actuator having an elastic member fixed with an electro-mechanical energy conversion element, and a vibration member that generates a vibration on a surface of the elastic member by supplying a drive signal to the electro-mechanical conversion element, the control method comprising the steps of:
- supplying a periodic signal to the electro-mechanical energy conversion element;
- detecting a drive state of the vibration member;
- outputting a waveform signal representing the drive state detected in the detecting step;
- comparing the waveform signal with a predetermined threshold value to obtain a pulse signal;
- calculating a value in accordance with a difference between a pulse width of the pulse signal from the comparing step and a time of a half period of the periodic signal; and
- controlling the operation of the supplying step on the basis of the calculation from the calculating step.

17. A control method according to claim 16, wherein the calculating step obtains a difference between a pulse width of the pulse signal and a time of a half period of the periodic signal, and obtains an inverse number of the difference.

18. A control method of controlling a vibration-type having an elastic member fixed with an electro-mechanical energy conversion element, and a vibrator that generates a vibration member on a surface of the elastic member by supplying a drive signal to the electro-mechanical conversion element, the control method comprising the steps of:
- supplying a periodic signal to the electro-mechanical energy conversion element;
- detecting a drive state of the vibration member;
- outputting a waveform signal representing the drive state detected in the detecting step;

comparing the waveform signal with a predetermined plurality of threshold values to obtain a plurality of pulse signals;

outputting a value in accordance with an edge interval between the plurality of pulse signals from the comparing step; and controlling the operation of the supplying step on the basis of an output from the step of outputting a value.

19. A control method according to claim 18, wherein the plurality of threshold values are two threshold values.

20. A control method according to claim 19, wherein the step of outputting a value involves obtaining an edge interval between two pulse signals which are determined in the comparing step, and obtaining an inverse number of the interval.

* * * * *

UNITED STATES PATENT AND TRADEMARK OFFICE
CERTIFICATE OF CORRECTION

PATENT NO. : 6,954,022 B2  
DATED : October 11, 2005  
INVENTOR(S) : Kenichi Kataoka It is certified that error appears in the above-identified patent and that said Letters Patent is hereby corrected as shown below:

Column 2,  
Line 32, "electromechanical" should read -- electro-mechanical --.

Column 4,  
Line 32, "comparing-the" should read -- comparing the --.

Column 5,  
Line 47, "T." should read -- T, --.

Column 7,  
Lines 2 and 3, "invertors" should read -- inverters --.  
Line 13, "R=R4" should read -- R1=R4 --.  
Line 25, "AS" should read -- ΔS --.

Column 10,  
Line 64, "capacitor CO" should read -- capacitor C0 --.

Column 12,  
Line 59, "unput" should read -- output --.

Column 13,  
Line 60, "wherein" should read -- wherein the --.

Column 14,  
Line 56, "vibration-type" should read -- vibration-type actuator --.

Signed and Sealed this

Second Day of May, 2006

JON W. DUDAS  
*Director of the United States Patent and Trademark Office*